United States Patent [19]

Stournas et al.

[11] 4,105,570

[45] Aug. 8, 1978

[54] OIL RECOVERY BY SURFACTANT WATERFLOODING

[75] Inventors: Stamoulis Stournas, Flemington, N.J.; Joseph J. Dickert, Jr., Lower Makefield Township, Bucks County, Pa.

[73] Assignee: Mobil Oil Corporation, New York, N.Y.

[21] Appl. No.: 782,594

[22] Filed: Mar. 29, 1977

[51] Int. Cl.$^2$ ............................................. E21B 43/22
[52] U.S. Cl. ............................... 252/8.55 D; 166/273; 166/274; 260/509; 260/513 N
[58] Field of Search ................... 252/8.55 D; 166/273, 166/274, 275; 260/509, 513 N

[56] References Cited

U.S. PATENT DOCUMENTS

| 2,678,333 | 5/1954 | Hartough et al. ................... 260/509 |
| 2,860,160 | 11/1958 | Sundberg et al. ................... 260/509 |
| 3,084,187 | 4/1963 | Gaertner ............................... 260/513 |
| 3,196,173 | 7/1965 | Willmund et al. ............... 260/509 X |
| 3,469,630 | 9/1969 | Hurd et al. ....................... 166/273 X |
| 3,890,239 | 6/1975 | Dycus et al. ................... 166/274 X |
| 3,977,471 | 8/1976 | Gale et al. ...................... 252/8.55 X |
| 4,008,768 | 2/1977 | Birk ...................................... 166/274 |

*Primary Examiner*—Herbert B. Guynn
*Attorney, Agent, or Firm*—C. A. Huggett; William D. Jackson

[57] ABSTRACT

A method of recovering oil from a subterranean oil reservoir by waterflooding in which at least a portion of the injected water contains an anionic surfactant comprising a hydrocarbyl hydroxyalkane aminoalkane sulfonate. The hydroxy group is in the 4- or 5-position with respect to the sulfonate group. This surfactant is stable in the presence of high concentrations of divalent metal ions. Thus, this process is applicable in those situations in which the reservoir waters and/or the waters employed in formulating the flooding medium exhibit high divalent metal ion concentrations.

4 Claims, No Drawings

OIL RECOVERY BY SURFACTANT WATERFLOODING

BACKGROUND OF THE INVENTION

This invention relates to the recovery of oil from subterranean oil reservoirs and more particularly to improved waterflooding operations involving the use of hydroxyalkane aminoalkane sulfonate surfactants which are suitable for use in brines containing relatively high concentrations of divalent metal ions.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions are commonly referred to as surfactant waterflooding or as low tension waterflooding, the latter term having reference to the mechanism involving the reduction of the oil-water interfacial tension. Thus far, many such waterflooding applications have employed anionic surfactants. For example, a paper by W. R. Foster entitled "A Low-Tension Waterflooding Process," Journal of Petroleum Technology, Vol. 25, February 1973, pp. 205–210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One problem encountered in waterflooding with certain of the anionic surfactants such as the petroleum sulfonates is the lack of stability of these surfactants in a so-called "high brine" environment. These surfactants tend to precipitate from solution in the presence of monovalent salts such as sodium chloride in concentrations in excess of about 2-3 weight percent and in the presence of much lower concentrations of divalent metal ions such as calcium and magnesium ions. Typically, divalent metal ion concentrations of about 50–100 ppm and above cause precipitation of the petroleum sulfonates. The salinity of the surfactant slug is also significant with regard to interfacial tensions achieved through the use of petroleum sulfonates such as disclosed in the Foster paper. Even in the absence of divalent metal ions, optimum interfacial tensions are seldom achieved at salinities significantly in excess of 2–3 weight percent.

Various surfactant formulations which will tolerate high salinities and/or high divalent metal concentrations have been proposed for use in high brine environments. Thus, U.S. Pat. No. 3,508,612 to Reisberg et al. discloses a low tension waterflooding process employing a calcium-compatible anionic-anionic surfactant system which can be employed in saline solutions containing from 0.01 to 5 molar NaCl and from about 0 to 0.01 molar $CaCl_2$. One of the anionic surfactants employed in the Reisberg et al. process is an organic sulfonate such as a petroleum sulfonate having an average molecular weight within the range of 430–470 and the other surfactant is a sulfated ethoxylated alcohol.

Another surfactant waterflooding process for use in high salinity environments is disclosed in U.S. Pat. No. 3,977,471 to Gale et al. This patent discloses the use of an $R_1$ hydrocarbyl ether-linked $R_2$ hydrocarbyl sulfonate. The $R_1$ lipophilic base is provided by a benzene, toluene, or xylene radical having an alkyl substituent containing 6–24 carbon atoms and the $R_2$ linking the sulfonate group with the alkoxy ether group is a $C_1$–$C_8$ alkyl, cycloalkyl, alkene or aryl radical. The $R_2$ hydrocarbyl group may be substituted with a hydroxyl group or a $C_1$–$C_8$ aliphatic group. Dodecyl, dimethyl benzene ether propane sulfonate is specifically disclosed by Gale et al. The Gale et al. process is said to be particularly useful in reservoirs having a high salinity brine, i.e. salinities of 2% or more, and the dodecyl, dimethyl benzene ether propane sulfonate is said to be stable in saline solutions containing from 7–14 weight percent sodium chloride.

Yet another surfactant waterflooding process for use in high brine environments is disclosed in U.S. Pat. No. 4,008,768 to Birk. This patent discloses an anionic-nonionic surfactant system suitable for use in aqueous environments exhibiting salinities within the range of 3–25 weight percent and containing divalent metal ions in amounts as high as 3 weight percent. A multicomponent surfactant system disclosed for use in the Birk process comprises an amide-linked sulfonate such as a di-substituted taurate containing a $C_{12}$–$C_{20}$ aliphatic group and a nonionic surfactant such as a polyethoxylated alkyl phenol or a polyethoxylated aliphatic alcohol.

SUMMARY OF THE INVENTION

In accordance with the present invention, there is provided a new and improved surfactant waterflooding process employing an anionic surfactant which is stable in brines containing relatively high concentrations of divalent metal ions. In carrying out the invention, at least a portion of the fluid introduced into the reservoir via a suitable injection system is an aqueous liquid which contains a water-soluble anionic surfactant characterized by the formula

wherein
R is an aliphatic hydrocarbon group or an aliphatic-substituted aryl hydrocarbon group providing a lipophilic base, and
M is an alkali metal, ammonium or substituted ammonium ion.

DESCRIPTION OF SPECIFIC EMBODIMENTS

The present invention involves the recovery of oil from a subterranean oil reservoir by a process involving the injection of an aqueous liquid containing a hydrocarbyl hydroxyalkane aminoalkane sulfonate surfactant. The hydroxyalkane aminoalkane sulfonates employed in carrying out the invention are specific with regard to the location of the hydroxy group in that it is in the 4- or 5-position with respect to the terminal sulfonate group. As indicated by the experimental work referred to hereinafter, the hydroxyalkane aminoalkane sulfonates tolerate high brine environments including those containing significant quantities of divalent metal ions. In addition, the surfactants employed in the present invention do not possess any readily hydrolyzable bonds and thus are resistant to degradation by hydrolysis in the subterranean reservoir.

The hydrocarbyl portion of the hydroxy amino sulfonate is an oil-soluble group which provides a suitable lipophilic base for the surfactant molecule. More specifically, the lipophilic base of the hydroxy amino sulfonates employed in the present invention is provided by an aliphatic group containing from 8–20 carbon atoms or an aliphatic-substituted aryl group. Where the lipophilic base is provided by an aliphatic-substituted aryl group, the aryl component may be a mononuclear group or a condensed ring dinuclear, e.g. benzene or naphthalene, and contains one or more aliphatic substituents. Preferably the aryl component is mononuclear in view of the practical considerations of economy and product synthesis and is substituted with a $C_6$–$C_{18}$ aliphatic group. The aliphatic group or aliphatic substituent may be unsaturated and/or contain branched chains but usually will take the form of normal alkyl radicals.

In a preferred embodiment of the invention, the hydroxy amino sulfonate employed in the injected aqueous liquid is an aliphatic or aliphatic-substituted aryl hydroxypropane aminomethane sulfonate in which the hydroxy group is in the 5-position with respect to the sulfonate group. This surfactant may be characterized by the formula

wherein
R is an aliphatic group or an aliphatic-substituted aryl group providing a lipophilic base, and
M is an alkali metal, ammonium, or substituted ammonium ion.

Where M is an alkali metal ion, it usually will take the form of sodium or potassium. Substituted ammonium ions which may be employed include mono-, di-, or tri-substituted alkylammonium or alkanolammonium ions. Examples of alkylammonium ions include methylammonium, ethylammonium, and normal- or isopropylammonium ions. Examples of alkanolammonium ions include monoethanolammonium and triethanolammonium ions.

In the case where R is an aliphatic-substituted aryl group, the aliphatic substituent normally will contain from 6 to 18 carbon atoms. Where R is an aliphatic group, i.e. where the lipophilic base does not include an aromatic nucleus, the aliphatic group normally will contain from 8–20 carbon atoms. A preferred class of aliphatic hydroxypropane aminomethane sulfonates for use in the present invention are those in which the aliphatic group contains from 8–15 carbon atoms.

The hydroxy aminomethane sulfonates employed in the present invention may be prepared by the reaction of aminomethane sulfonic acid and formaldehyde with an olefin as described in U.S. Pat. No. 2,678,333 to Hartough et al. Thus the surfactants characterized by formula (1) above can be prepared by the reaction of aminomethane sulfonic acid and formaldehyde with an alpha-olefin or with an aliphatic-substituted vinyl aromatic compound such as a substituted styrene or a substituted vinyl naphthalene.

As an example illustrating the preparation of the surfactants employed in the present invention, n-octylhydroxypropane aminomethane sulfonate was prepared by the reaction of 1-decene with formaldehyde and aminomethane sulfonic acid as follows:

Twenty-eight grams of aminomethane sulfonic acid were added to a mixture of 25 cc of 37% aqueous formaldehyde and 75 cc of water, and the mixture heated to about 50° C. Thirty-six grams of 1-decene were added to the mixture with stirring and the temperature then brought up to about 70° C., and held there for about 3 hours. On cooling, 18 grams of a pasty solid separated. The liquid was decanted and the solid was suspended in 200 cc of water. A solution of 2.6 grams of sodium hydroxide in 150 cc of water was added with stirring until the solid dissolved. This provided an aqueous solution of sodium n-octylhydroxypropane aminomethane sulfonate having a strength of about 5%.

It will be recognized by those skilled in the art that the synthesis procedure described in the Hartough et al. patent may be followed in making other hydroxy amino sulfonates to be employed in the present invention. For example, dodecylbenzene hydroxypropane aminomethane sulfonate can be prepared by reaction of formaldehyde and aminomethane sulfonic acid with dodecyl vinylbenzene and subsequent neutralization as described above.

In order to determine the effect of a high brine environment on the hydroxy amino sulfonates employed in the present invention, a brine stability experiment was carried out for the n-octyl hydroxypropane aminomethane sulfonate prepared in accordance with the previously described example. The surfactant was dissolved in a mixed brine solution in an amount to provide a surfactant concentration of 1 weight percent. The mixed brine contained 4.5 weight percent sodium chloride, 1.8 weight percent calcium chloride, and 0.7 weight percent magnesium chloride for a total salinity of 7 weight percent and a divalent metal ion concentration somewhat in excess of 8,000 parts per million. The mixed brine-surfactant solution was then aged for a period of 10 days at room temperature and was examined periodically for evidence of precipitation. Visual observations of the surfactant solution confirmed that the hydroxy amino sulfonate tolerated this high brine environment without any sign of precipitation.

In view of the stability of the hydroxy amino sulfonates in the presence of divalent metal ions, the present invention may be carried out in reservoirs in which the connate water contains significant divalent ion concentrations and in situations where the available flooding medium contains divalent metal ions in amounts inconsistent with the conventional use of hydrocarbon sulfonate surfactants. Thus a preferred application of the invention is in those situations in which the reservoir waters and/or the waters employed in formulating the flooding medium exhibit divalent metal ion concentrations in excess of about 500 parts per million.

The hydroxy amino sulfonates of the present invention may be employed in conjunction with other chemical waterflood additives such as thickening agents or other surfactants. Where the hydroxy amino sulfonates are employed in co-surfactant formulations, the other surfactants should be anionic, such as the petroleum sulfonates or synthetic sulfonates described previously, or nonionic, such as the previously described polyethylene oxide type surfactants. Where a thickening agent is employed for mobility control purposes, the thickening agent may be added to the aqueous surfactant slug containing the hydroxy amino sulfonate or it may be injected in a separate mobility control slug. Normally, the thickening agent will be employed in a separate mobility control slug injected immediately after the slug containing the surfactant. The thickening agent may be added in concentrations so as to provide graded viscosity at the trailing edge of the mobility control slug or graded viscosities at both the leading and trailing edges of the mobility control slug. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as Polysaccharide B-1459 available from the Kelco Company under the trade name "Kelzan" and the various partially hydrolyzed polyacrylamides available from the Dow Chemical Company under the trade name "Pusher Chemicals."

The hydroxy amino sulfonates may be employed in accordance with the present invention in any suitable concentration depending upon the characteristics of the particular reservoir involved and such factors as surfactant consumption, e.g. by adsorption, and dispersion of the surfactant into the reservoir waters. In most cases, it will be preferred to employ the hydroxy amino sulfonate in a concentration within the range of 0.1 to 2.5 weight percent.

While the aqueous solution of the hydroxy amino sulfonate may be employed as the sole displacing fluid, it will usually be injected as a discrete slug and then followed by a driving fluid. Typically the size of the surfactant slug will be within the range of 0.05 to 1.0 pore volume. Where a relatively viscous mobility control fluid is employed, as described previously, it normally will be injected in an amount within a range of 0.05 to 0.3 pore volume. Thereafter a driving fluid is injected in order to displace the previously injected fluids through the formation. The driving fluid typically may be any water which is locally available and is not incompatible with the formation. The driving fluid is injected in such amount as necessary to carry the recovery process to its conclusion.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al. patent. By the term "pore volume" as used herein, it is meant that volume of the portion of the formation underlying the well pattern employed, as described in greater detail in the Burdyn et al. patent.

We claim:

1. In a method for the recovery of oil from a subterranean oil reservoir penetrated by spaced injection and production systems in which an aqueous fluid is introduced into said reservoir via said injection system to displace oil to said production system, the improvement comprising employing as at least a portion of the fluid introduced into said injection system an aqueous liquid containing a water-soluble anionic surfactant characterized by the formula

wherein
R is an aliphatic hydrocarbon group or an aliphatic-substituted aryl hydrocarbon group providing a lipophilic base, and
M is an alkali metal, ammonium, or substituted ammonium ion.

2. The method of claim 1 wherein R is an aliphatic group containing from 8-20 carbon atoms.

3. The method of claim 2 wherein R is an aliphatic group containing from 8-15 carbon atoms.

4. The method of claim 1 wherein R is an aliphatic-substituted aryl group having an aliphatic substituent containing from 6-18 carbon atoms.

* * * * *